UNITED STATES PATENT OFFICE.

RUDOLF HÖMBERG, OF CHARLOTTENBURG, GERMANY.

MANUFACTURE OF FILAMENTS, FILMS, AND OTHER CELLULOSE PRODUCTS FROM CELLULOSE SOLUTIONS.

983,139.  Specification of Letters Patent.  Patented Jan. 31, 1911.

No Drawing.  Application filed August 20, 1910.  Serial No. 578,225.

*To all whom it may concern:*

Be it known that I, RUDOLF HÖMBERG, a subject of the German Emperor, residing at Charlottenburg, near Berlin, Germany, have invented certain new and useful Improvements in the Manufacture of Filaments, Films, and other Cellulose Products from Cellulose Solutions, of which the following is a specification.

It is well-known, that artificial filaments, films and other cellulose products are produced from cuprammonia solutions of cellulose. I have discovered, that the filaments and other products thus obtained are considerably more valuable, if an aldehyde or a compound of the same, such as formaldehyde, is added to the cuprammonia solution of cellulose before it is spun into threads, for instance by adding 10 per cent. of a 40 per cent. formaldehyde solution to the cellulose solution produced in the usual manner. By this treatment a chemical change occurs in the solutions themselves, as can be easily recognized by the fact, that the solutions, when poured out on a plate and allowed to dry, leave clear transparent films or layers, while the same solutions without the addition of formaldehyde form milky opaque films.

The new products differ from those produced in exactly the same manner from solutions free from aldehyde by a softer touch, greater clearness and greater strength. Moreover, their resistance to water is increased, although to a less degree.

What I claim is:—

1. The process for the manufacture of filaments, films and other cellulose products from cuprammonia-solutions of cellulose, which consists in adding to the said solutions an aldehyde and then treating them further in the usual manner.

2. The process for the manufacture of filaments, films and other cellulose products from cuprammonia solutions of cellulose, which consists in adding formaldehyde to the said solutions and then treating them further in the usual manner.

In testimony whereof I affix my signature in presence of two witnesses.

RUDOLF HÖMBERG.

Witnesses:
 HENRY HASPER,
 ARTHUR SCHROEDER.